E. Y. MOORE.
Pulley-Blocks.

No. 198,247. Patented Dec. 18, 1877.

Witnesses:
P. C. Dieterich
Frank H. Duffy

Inventor:
Edward Y. Moore.
Per C. H. Watson & Co. Attorneys.

UNITED STATES PATENT OFFICE.

EDWARD Y. MOORE, OF CHICAGO, ILLINOIS.

IMPROVEMENT IN PULLEY-BLOCKS.

Specification forming part of Letters Patent No. 198,247, dated December 18, 1877; application filed November 28, 1877.

*To all whom it may concern:*

Be it known that I, EDWARD Y. MOORE, of Chicago, in the county of Cook and State of Illinois, have invented certain new and useful Improvements in Pulleys for Hay-Forks and other purposes; and I do hereby declare that the following is a full, clear, and exact description thereof, which will enable others skilled in the art to which they appertain to make and use the same, reference being had to the accompanying drawings, and to the letters of reference marked thereon, which form a part of this specification.

The nature of my invention consists in the construction and arrangement of an anti-friction pulley to be used for hay-forks and other purposes, as will be hereinafter more fully set forth.

Figure 1:
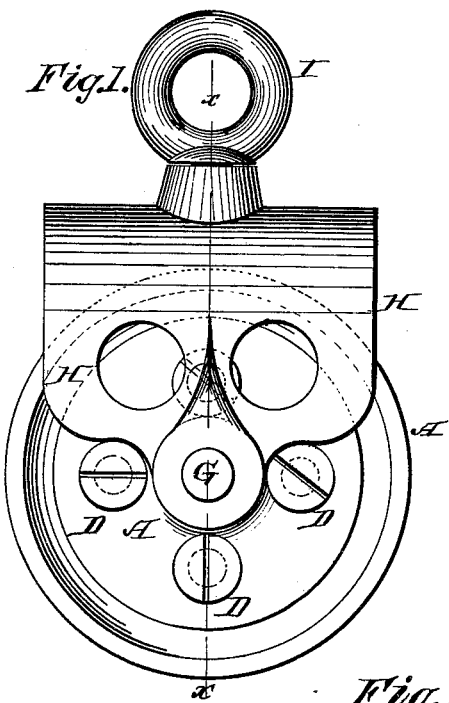
Figure 2:
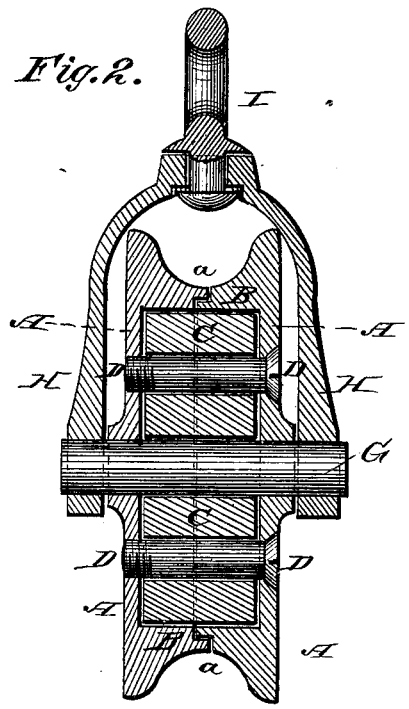
Figure 3:
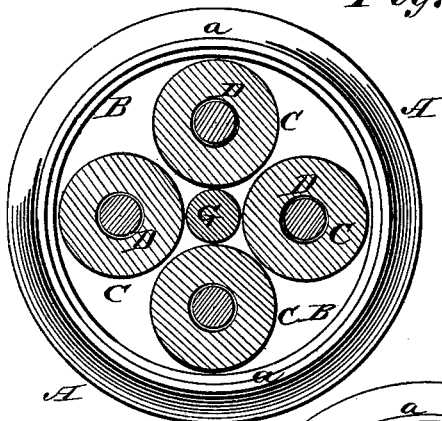
Figure 5:
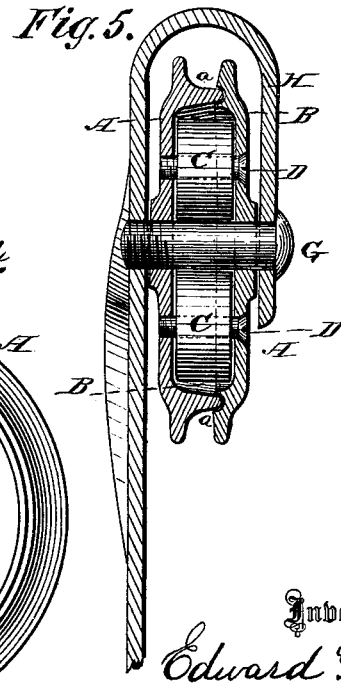
Figure 4:
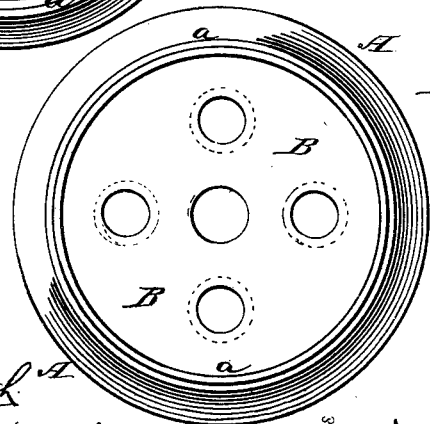

In the annexed drawings, to which reference is made, and which fully illustrate my invention, Figure 1 is a side elevation. Fig. 2 is a central vertical section on line $x\,x$, Fig. 1. Figs. 3 and 4 are open plan views of the parts A A, partly in section; and Fig. 5 is a sectional view as applied to a hanger.

The pulley is made in two parts, A A, so constructed that when put together a circumferential groove will be formed of any suitable depth, according to the use to which the pulley is to be put. The joint between the two parts is preferably made rabbeted, as shown at $a$, so that one part will fit over the other. Each half, A, is formed with a circular recess, B, concentric with the pulley, the two recesses forming, when the pulley is put together, a circular or cylindrical chamber within the pulley. In this chamber are placed three or more anti-friction rollers, C C, which turn upon bolts or rivets D D passing centrally through them and uniting the two halves of the pulley. Through the center of the pulley passes a bolt or shaft, G, which pivots the pulley in a cap or block, H.

The rollers C are of such diameter, and so arranged with relation to the central shaft G, that the rollers will rest on said shaft, and the body of the pulley have no bearing on the shaft.

In manufacturing the rollers C we prefer to cast them in molds, which will give true smooth castings at very much less expense than if they had to be turned true.

The cap or block H is provided with a swiveled hook, I, adapting the pulley for use in hay-forks. It may also be applied to door-hangers by providing the requisite strap required for that purpose. The pulley, as constructed, may also be applied to other purposes where pulleys are needed.

Having thus fully described my invention, what I claim as new, and desire to secure by Letters Patent, is—

An anti-friction pulley made in two parts, A A, each having a circular recess, B, and interior rollers C C, mounted upon bolts or rivets D D therein, all substantially as and for the purposes herein set forth.

In testimony that I claim the foregoing as my own I have hereto affixed my signature in presence of two witnesses.

EDWARD Y. MOORE.

Witnesses:
CHARLES SHOLL,
V. MUMFORD MOORE.